Oct. 13, 1970
C. W. RHODES
3,534,155
MEASUREMENT OF CHARACTERISTIC OF ELECTRICAL SIGNAL BY
POSITIONING MEASURED PORTIONS OF A CORRESPONDING
PAIR OF OPPOSITE PHASE SIGNALS IN COINCIDENCE
Filed Oct. 5, 1967
2 Sheets-Sheet 1
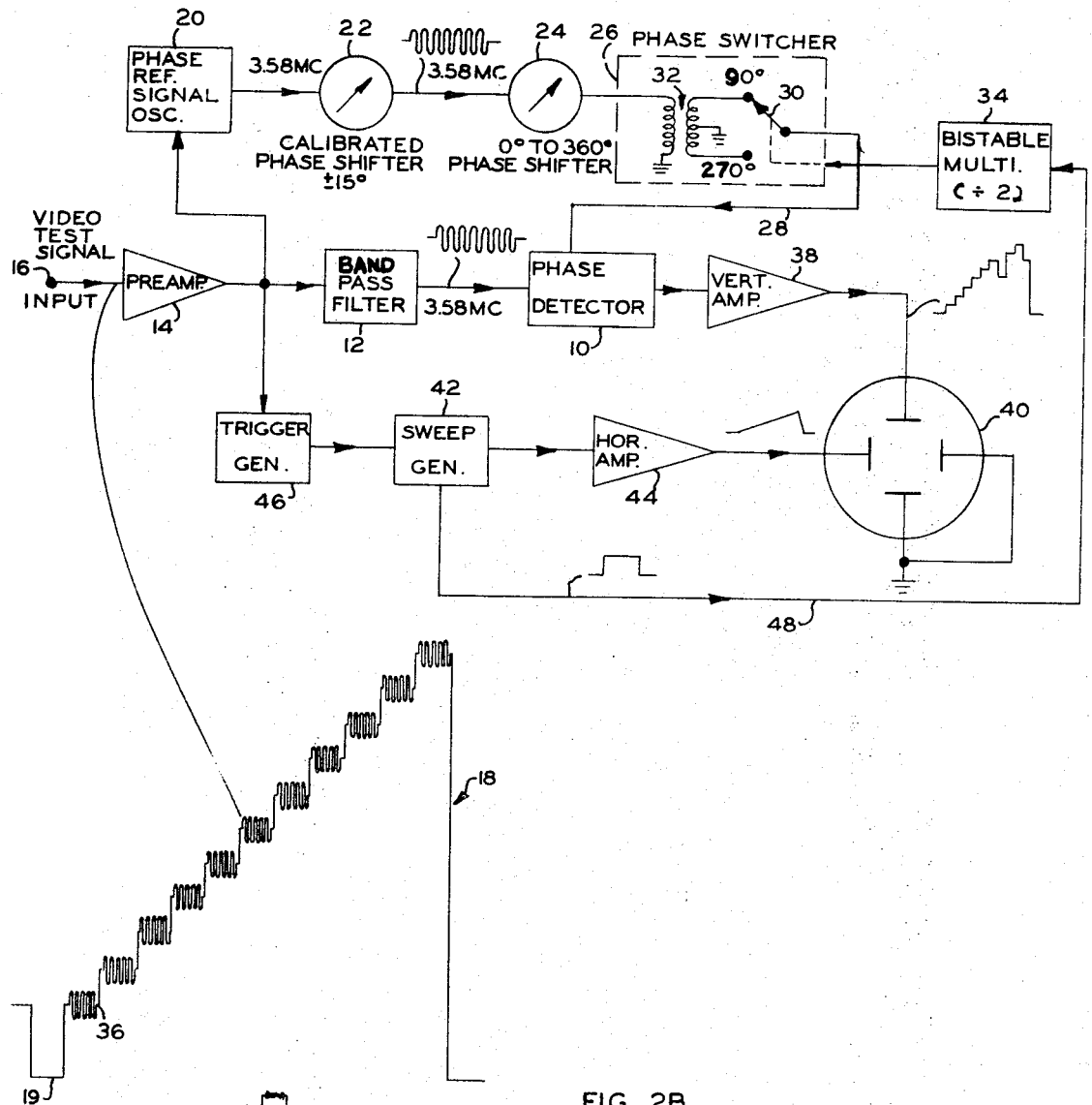
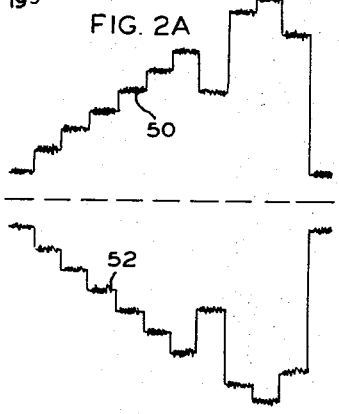
FIG. 2A
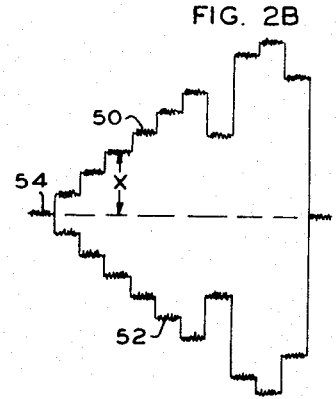
FIG. 2B
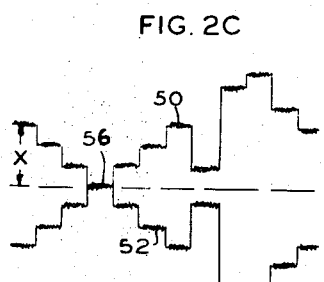
FIG. 2C
CHARLES W. RHODES
INVENTOR
BY
BUCKHORN, BLORE, KLARQUIST & SPARKMAN
ATTORNEYS

CHARLES W. RHODES
INVENTOR

BY
BUCKHORN, BLORE, KLARQUIST & SPARKMAN
ATTORNEYS

United States Patent Office 3,534,155
Patented Oct. 13, 1970

3,534,155
MEASUREMENT OF CHARACTERISTIC OF ELECTRICAL SIGNAL BY POSITIONING MEASURED PORTIONS OF A CORRESPONDING PAIR OF OPPOSITE PHASE SIGNALS IN COINCIDENCE
Charles W. Rhodes, Cedar Hills, Oreg., assignor to Tektronix, Inc., Beaverton, Oreg., a corporation of Oregon
Filed Oct. 5, 1967, Ser. No. 673,069
Int. Cl. H04n 5/38
U.S. Cl. 178—5.4                                        10 Claims

ABSTRACT OF THE DISCLOSURE

Apparatus for measuring phase, voltage or current of a repetitive signal is described in which two corresponding measurement signals inverted with respect to each other are displayed simultaneously on a cathode ray tube and the same waveform portions of such signals are moved into coincidence in order to determine the value of the characteristic being measured. This coincidence measurement technique prevents errors caused by noisy signals and is used to measure phase distortion of a color television signal.

BACKGROUND OF THE INVENTION

The subject matter of the present invention relates generally to measurement of the characteristics of repetitive electrical signals and in particular to apparatus for measuring the phase, voltage or current of such a signal by generating two corresponding measurement signals with the same but inverted waveforms and displaying such signals simultaneously on a cathode ray tube, positioning selected reference portions at the same points on the waveform of such measurement signals into coincidence, and thereafter moving the same measured portions of such signals into coincidence. A calibrated control may be employed to move the measured portions into coincidence so that the value of such measured portions can be read directly off the dial of such control.

While the apparatus of the present invention may be used for measuring other signal characteristics, it it especially useful for measuring phase distortion in color television signals. Thus such apparatus may be provided in a vectorscope type of cathode ray oscilloscope to measure differential phase distortion when such oscilloscope is operated in the "line sweep" mode. Previous vectorscopes measure color television signal phase distortion by comparing an output signal whose amplitude is proportional to the phase distortion with a horizontal reference line. In order to obtain precise measurements, the reference line must be positioned at the exact center of the trace of the measured signal portion on the cathode ray tube, which is extremely difficult for noisy signals. This problem is overcome by the present invention because the measured signal is inverted to produce a second signal opposite in phase but otherwise similar to the measured signal and the phase distortion of a selected signal portion is measured by moving the two corresponding signal portions into coincidence with each other. Since both of the coincident signal portions will be noisy to the same degree, it is relatively easy to superimpose such signal portions in coincidence. Before making the phase measurement, selected reference portions of the two phase inverted signals are placed in coincidence to establish a phase reference. Once such reference is set, a calibrated phase shifter is adjusted to provide coincidence of the measured signal portions so that the phase shift of such measured signal portions may be read directly on the dial of such phase shifter because it is initially set in its zero position.

A similar technique can be used to measure voltage or current except that the signal being measured is applied to one input of an amplifier having a pair of outputs of opposite phase. The amplifier may be a differential or paraphase amplifier having a second input connected to a calibrated voltage divider for applying predetermined values of D.C. voltage thereto. The two outputs of the paraphase amplifier are 180 degrees out of phase with each other and are connected by a phase switcher to the cathode ray tube to provide two similar measurement signals which are opposite in phase. With the calibrated voltage divider set in the zero or ground position, the D.C. voltage level of the other input of the paraphase amplifier is adjusted until the D.C. level of the input signal is also ground. This causes the D.C. level reference portions of the two measurement signals to coincide. Then the calibrated voltage divider is adjusted until the measured portions of the two signals coincide and the voltage or current amplitude of such measured portion is read directly off the dial of such voltage divider.

It is therefore one object of the present invention to provide an improved apparatus for measuring the characteristics of a repetitive electrical signal by positioning the measured portions of two corresponding signals of the same waveform but opposite in phase, in coincidence.

Another object of the present invention is to provide an improved apparatus for measuring the characteristics of repetitive electrical signals which is more accurate and easier to operate for noisy signals.

A further object of the present invention is to provide an apparatus for measuring the phase distortion of a color television signal whereby two similar measurement signals of opposite phase are produced whose amplitude is proportional to the phase distortion, and, after establishing reference levels on the measurement signals, the selected measured portions of such measurement signals are positioned in coincidence on a cathode ray tube or other display device to enable more accurate measurement of the phase distortion of such measured portion.

An additional object of the present invention is to provide an improved method and apparatus for measuring the voltage or current of an input signal by producing two corresponding measurement signals opposite in phase and adjusting the position of the measurement signals until the measured portions of such signals coincide on a cathode ray tube or other display device after having established a reference level on such signals from which the current or voltage is measured.

Other objects and advantages of the present invention will be apparent from the following detailed description of certain preferred embodiments thereof and from the attached drawings of which:

FIG. 1 is a schematic diagram of an electrical circuit forming one embodiment of the invention for measuring phase;

FIGS. 2A, 2B and 2C are oscilloscope displays seen on the cathode ray tube of the apparatus of FIG. 1 during different steps in the operation of such apparatus;

Figure 3:
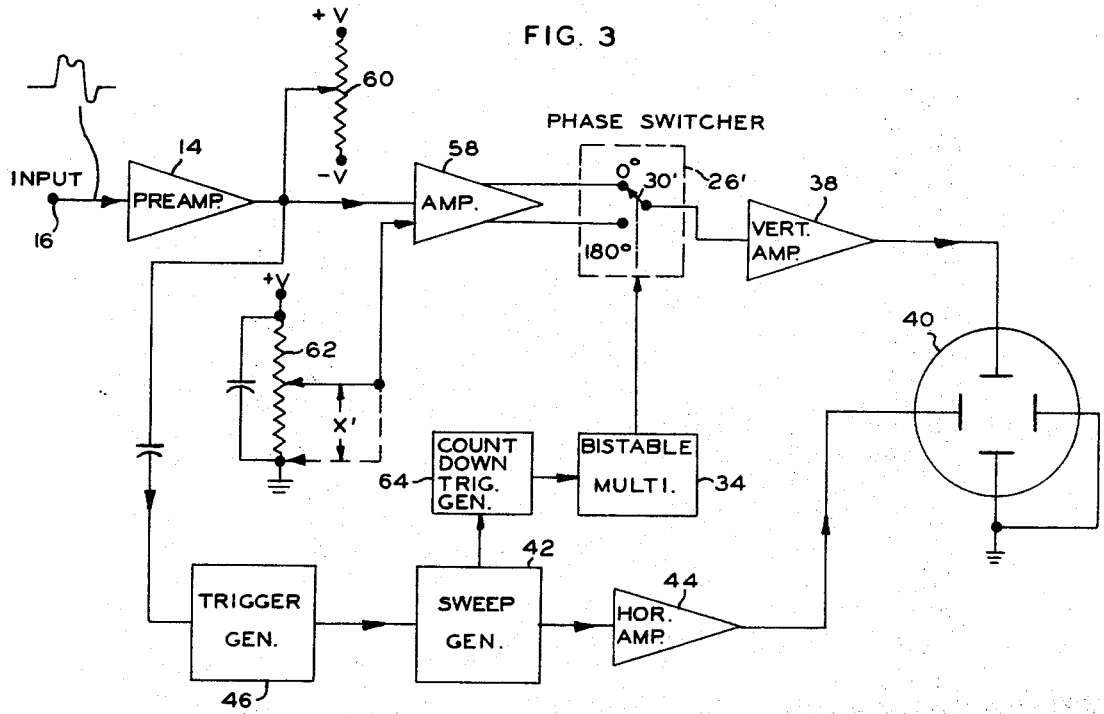
FIG. 3 is a schematic diagram of an electrical circuit in accordance with another embodiment of the present invention for measuring voltage or current.

The differential phase distortion which occurs in NTSC type color television systems due to nonlinear mixing of the $3.58 \times 10^{+6}$ c.p.s. color subcarrier signal with the luminance signal, can be measured by the circuit of FIG. 1. Such circuit includes a phase detector 10 having one input connected through a chrominance signal band pass filter 12, and a preamplifier 14 to an input terminal 16. The video test signal 18 applied to input terminal 16 may be in the form of a 15,750 c.p.s. stairstep luminance signal consisting of ten stairsteps equally dividing the range extending between black and white luminance levels, on which an unmodulated 3.58 megacycle sine wave color subcarrier signal is imposed. The test signal also has a negative going horizontal sync portion 19 at the beginning of such test signal. The filter 12 has a frequency band pass of about 3.08 to 4.08 megacycles with a center frequency of 3.58 megacycles and therefore transmits only the 3.58 megacycle color signal to the phase detector. This color signal has phase distortion due to being mixed nonlinearly with the luminance signal, such distortion being different for each stairstep, and therefore such color signal is modulated in phase to some extent.

A phase reference signal oscillator 20 is provided which produces an output signal of 3.58 megacycles having a constant phase which is used as the reference against which the color subcarrier signal is compared in the phase detector 10. The phase reference oscillator 20 is synchronized with the 3.58 megacycles modulation portion of the test signal 18 by connecting the output of the preamplifier 14 to such oscillator. This phase reference signal is transmitted from the oscillator 20 through a calibrated phase shifter 22 and an uncalibrated phase shifter 24 to the input of a phase switcher 26, whose output is connected to the phase detector 10 through conductor 28. The phase switcher 26 is shown schematically to include a switch 30 which may actually be an electronic switching circuit. Switch 30 is switched between the two end terminals of the secondary winding of a transformer 32, such switch being actuated by the output signal of a bistable multivibrator 34. The primary winding of the transformer 32 is connected to the phase reference oscillator and the center tap of the secondary winding of such transformer is grounded so that two similar reference signals of opposite phase are produced at the end terminals of the secondary winding. These two reference signals are alternately applied to the phase detector 10 by the switch 30.

The uncalibrated phase shifter 24 is capable of varying the phase of the reference signal from zero to 360 degrees. This uncalibrated phase shifter is adjusted until the two reference signals produced at the output of the phase switcher 20 have phases of 90 degrees and 270 degrees, respectively, with respect to the color subcarrier signal transmitted through the high pass filter 12 at the reference portion corresponding to the "black" level 36 of the test signal at the bottom of the first step immediately after the horizontal sync portion. Since the output of the phase detector is proportional to the cosine of the angle of the phase difference between the reference signal and the color subcarrier, the output of the phase detector is zero when the phase relationship of such reference signal and such color subcarrier signal is 90 degrees or 270 degrees, as is true of the portion of the color subcarrier corresponding to the black level. However, where there is a phase shift in the color subcarrier signal, the phase detector 10 will produce an output measurement signal whose voltage is proportional to the cosine of such phase distortion. This measurement signal whose waveform is shown in FIG. 2A, is then transmitted through a vertical amplifier 38 to the vertical deflection plates of a cathode ray tube 40 or to another display device. At the same time a linear ramp or sawtooth sweep voltage is applied to the horizontal deflection plates of the cathode ray tube by a sweep generator 42 connected thereto through a horizontal amplifier 44.

It should be noted that while the opposite deflection plate of both pairs of horizontal and vertical deflection plates is shown as being grounded for simplicity, actually the vertical and horizontal amplifiers apply push-pull deflection signals to both deflection plates of each vertical and horizontal pair. The sweep generator may be triggered by a trigger generator 46 whose input is connected to the output of preamplifier 14, so that such trigger generator itself is triggered by the horizontal sync portion 19 of the video test signal 18. Of course, a trigger generator 46 may not be necessary if the video test signal is a stable periodic signal operating at a line frequency of 15,750 cycles per second, because the sweep generator 42 can be made to free run at such line frequency.

The cathode ray tube blanking signal produced by the sweep generator 42 may be applied through conductor 48 to the bistable multivibrator 34 to trigger such multivibrator during the retrace portion of the sweep. This causes the phase switcher 26 to switch at a frequency of 7,875 cycles per second because such multivibrator produces one output pulse for every two sweep signals, one of such two sweep signals triggering and the other reverting the bistable multivibrator.

As shown in FIG. 2A, a pair of traces 50 and 52 of the same waveforms but inverted with respect to each other are produced on the cathode ray tube 40, such traces corresponding to the two measurement signals of opposite phase produced at the output of the phase detector 10 as a result of the alternate switching of the phase switcher 26. The upper measurement signal 50 is produced when the switch 30 is in the 90 degree position shown, while the lower measurement signal 52 is produced when the switch is in the 270 degree position. These waveform traces 52 and 54 are produced with alternate sweep signals at different times but are displayed simultaneously on the fluorescent screen of the cathode ray tube due to the light emission persistence of the phosphor used in such fluorescent screen.

As shown in FIG. 2B, the first step in measurement is adjustment of the uncalibrated phase shifter 24 to position the measurement signal traces 50 and 52 so that their two reference portions 54 at the same points on their inverted waveforms and corresponding to the black level 36 of the test signal 18, are superimposed and coincide with each other on the cathode ray tube. The second step is to adjust the calibrated phase shifter 22 from its initial zero position to the proper value between, for example +15 and −15 degrees, which will move the signal traces 50 and 52 to cause the two selected portions 56 being measured at the same third stairstep of their waveforms to be brought into coincidence, as shown in FIG. 2C. Thus, the third stairstep measured portion 56 of the measurement signals 50 and 52 is phase shifted from the reference portion 54 by an angle proportional to the value X which is the vertical distance through which the measurement signal traces were moved by the calibrated phase shifter to bring the measured portions into coincidence. The phase distortion angle corresponding to X may be read directly off the dial of the calibrated phase shifter 22, since such phase shifter was initially set at zero when the reference portions 54 were brought into coincidence. It should be noted that for small angles of about 15 degrees or less, the cosine of such angle is approximately linearly proportional to the value of the angle in radians.

Any noise in the measurement signals and their corresponding traces 50 and 52 is prevented from causing any inaccuracy because the two reference portions 54 and the two measurement portions 56 of such noisy traces are easily brought into coincidence since the widths of such coincident trace portions are always the same. There is also an increase in resolution with increases in gain for noisy signals due to the fact that the distance between the measurement signals 50 and 52 increases by a factor which is twice the gain while the width of the noise on such signal traces increases by a factor equal to such gain.

The phase shifters 22 and 24 may be moved to a position between the high pass filter 12 and the phase detector 10 to shift the color subcarrier rather than the reference signal, since it is only the relative phase of these two signals which must be shifted to enable measurement of the phase distortion. Also other phase shifters may be employed than the one illustrated, which is much simplified for purposes of clarity.

A voltage or current measurement apparatus is shown in FIG. 3, which is somewhat similar to the phase measurement apparatus of FIG. 1 so that only the differences in the apparatus of FIG. 3 will now be described. A phase splitter amplifier 58 which may be a differential paraphase amplifier as shown, is provided with one input connected to the output of the preamplifier 14 for receiving the input signal being measured. Such one input of amplifier 58 is also connected to the movable contact of a potentiometer 60 whose end terminals are connected between positive and negative sources of D.C. supply voltage in order to adjust the D.C. voltage level of the input signal at such one input so that such level is at ground potential for reasons hereafter described. The other input of the paraphase amplifier 58 is connected to the movable contact of a second potentiometer 62 whose end terminals are connected between a source of positive D.C. supply voltage and ground. This second potentiometer 62 is calibrated so that the value of the voltage or current characteristic being measured may be read directly off the dial of such potentiometer.

The paraphase amplifier 58 has two outputs which are of opposite phase and are alternately connected by a phase switcher circuit 26' to the input of the vertical amplifier 38. The electronic switch circuit, represented by mechanical switch 30', of the phase switcher is actuated by the output signal of the bistable multivibrator 34 which may be triggered by the output signal of a countdown trigger generator 64 whose input is connected to the sweep generator 42. The countdown trigger generator 64 produces one output trigger signal for a predetermined number of sweep signals and such trigger signal is therefore much lower in frequency than the input signal being measured.

Figure 4A:
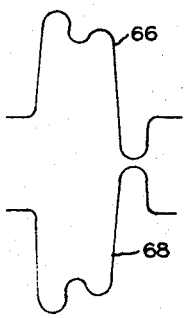
FIGS. 4A, 4B and 4C are oscilloscope waveforms seen on the cathode ray tube of the apparatus of FIG. 3 of different steps in the operation of such apparatus.
Figure 4B:
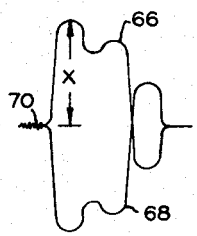
Figure 4C:
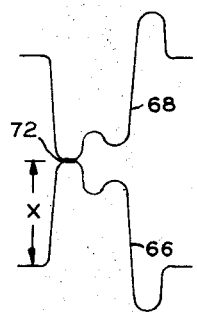

As a result of the action of the phase switcher 26', two measurement signals of opposite phase and of similar waveform corresponding to the input signal are applied to the vertical deflection plates of the cathode ray tube 40 in an alternate manner, whose frequency depends upon the frequency of the multivibrator 34. As shown in FIG. 4A, these two measurement signals produce corresponding signal traces 66 and 68 on the fluorescent screen of the cathode ray tube 40 where waveforms are inverted with respect to each other. If it is desired to measure the maximum voltage amplitude of the input signal, the two measurement signal traces 66 and 68 are adjusted in position vertically by means of potentiometer 60 until the two reference portions 70 at the same points on the waveform of such traces coincide, as shown in FIG. 4B. These reference portions may be the quiescent D.C. levels of the signals which are adjusted to ground potential by potentiometer 60 at the upper input of the paraphase amplifier 58, since the lower input of such amplifier is also at ground potential in the initial setting of potentiometer 62. Next, the two selected portions 72 at the same points on the waveforms of the signal traces 66 and 68 being measured are adjusted vertically until such measured portions coincide, as shown in FIG. 4C. This is accomplished by adjustment of the movable contact of potentiometer 62 from its initial position represented by the dashed line, to the solid line position shown. As a result of its initial setting at ground, the dial of the calibrated potentiometer 62 directly indicates the value of the signal amplitude X of a measured portion of the signal waveform 66, since the voltage X' on the movable contact of such potentiometer in its final setting is proportional to such signal amplitude.

It should be noted that even if the measurement signal traces 66 and 68 of FIGS. 4A, 4B and 4C are somewhat blurred due to noise in the input signal being measured, such noise not being shown for pusposes of clarity, this will not affect the accuracy of the measurement with the coincidence technique of the present invention. By this coincidence technique, similar measure portions of identical but inverted signal waveforms are superimposed on each other. Since both of the measured portions 72 have the same noise component, they can easily be superimposed and caused to coincide with each other. This advantage is also present in the phase measurement technique of FIGS. 1 and 2, as mentioned previously. Furthermore, in the prior art apparatus any drift of the signal or the horizontal reference line against which it is measured is not readily discernible, but signal drift is clearly apparent with the coincidence technique of the present invention since the measured signal portions are moved out of coincidence by such drift.

It is apparent from the above description, the method and apparatus of the present invention operates by nulling the signal being measured against itself, which is a duplicate but inverted signal. This nulling is accomplished with great accuracy because a cathode ray tube is employed as the null indicator.

It will be obvious to those having ordinary skill in the art that many changes may be made in the details of the above described preferred embodiment of the present invention without departing from the spirit thereof. Therefore the scope of the present invention should only be determined by the following claims.

I claim:

1. Apparatus for measuring the characteristics of repetitive electrical signals, comprising:

a signal generator means for generating a pair of measurement signals whose amplitude is proportional to the characteristic of the signal being measured, and which are of the same waveform but inverted with respect to each other;

display means, connected to the output of said signal generator means, for displaying said pair of measurement signals simultaneously as two light images of the waveforms of said measurement signals with the same corresponding portions of the two signal images being aligned in the time but inverted in amplitude with respect to each other;

positioning means for positioning the two signal images so that the same corresponding reference portions on each of said signal images are placed in coincidence; and measurement means for moving at least one of said signal images in the amplitude direction until a selected portion of said one signal image is superimposed on and coincides with the same corresponding portion of the other signal image in order to measure said characteristic of said selected portion.

2. Apparatus in accordance with claim 1 in which the display means includes a cathode ray tube having a vertical deflection means to which the pair of measurement signals are applied and having a horizontal deflection means to which a standard sweep signal is applied for each measurement signal in synchronism therewith.

3. Apparatus in accordance with claim 2 in which the signal generator means includes a switch circuit which is switched between two conditions in synchronism with sweep signal to produce the pair of inverted measurement signals.

4. Apparatus in accordance with claim 1 in which phase is the measured characteristic and the signal generator means includes a phase detector circuit to which a modulated input signal and an unmodulated reference signal of the same carrier frequency are applied to produce an output signal whose amplitude is proportional to any difference in phase between said input signal and said reference signal, and a switch circuit for selecting said reference signal from two similar reference signals which are opposite in phase by switching between said two reference signals once for each output signal so that alternate output signals provide the pair of measurement signals.

5. Apparatus in accordance with claim 4 in which the measurement means includes a calibrated phase shifter which can be adjusted to decrease the phase difference between said reference signal and a selected portion of said input signal being measured until the corresponding selected portions of the two measurements coincide to indicate the initial phase difference on the dial of the phase shifter when this coincidence has been obtained.

6. Apparatus in accordance with claim 5 in which the positioning means includes a second phase shifter which can be adjusted to decrease the phase difference between the reference portions of the pair of measurement signals to zero by causing the corresponding reference portions of their signal images to coincide in the zero position of the calibrated phase shifter.

7. Apparatus in accordance with claim 4 in which the phase detector circuit is connected to a source of color television test signals so that the input signal is the chrominance signal of a color television test signal and the reference signal is an unmodulated color subcarrier signal.

8. Apparatus in accordance with claim 1 in which voltage or current is the measured characteristic and the signal generator means includes an amplifier having a pair of outputs of opposite phase and a first input connected to an input terminal to which are applied the input signals being measured; and a switch means for alternately connecting the pair of outputs of the amplifier to the output of the signal generator means in order to produce said pair of measurement signals.

9. Apparatus in accordance with claim 8 in which the amplifier is a paraphase amplifier also having a second input connected to an adjustable source of D.C. supply voltage.

10. Apparatus in accordance with claim 9 in which the measurement means is a calibrated variable resistance potentiometer connected to the second input of the paraphase amplifier to provide said adjustable source of D.C. supply voltage, said calibrated potentiometer being adjustable to cause the selected portions of the measurement signal to coincide and to indicate the voltage or current of the corresponding selected portion of the input signal on the dial of the potentiometer when this coincidence is obtained.

References Cited

UNITED STATES PATENTS

| | | | |
|---|---|---|---|
| 2,751,429 | 6/1956 | Schlesinger | 324—88 |
| 3,230,304 | 1/1966 | Schonfelder | 178—5.4 |
| 3,449,671 | 6/1969 | Long | 324—121 |

RICHARD MURRAY, Primary Examiner

A. H. EDDLEMAN, Assistant Examiner

U.S. Cl. X.R.

324—88, 121

UNITED STATES PATENT OFFICE
CERTIFICATE OF CORRECTION

Patent No. 3,534,155   Dated October 13, 1970

Inventor(s) CHARLES W. RHODES

It is certified that error appears in the above-identified patent and that said Letters Patent are hereby corrected as shown below:

Column 6, line 2, "measure" should be --measured--; column 6, line 11, before "signal" insert --such--; column 6, beginning of line 30, delete "a"; column 6, line 40, before "time" delete --the--; column 6, line 61, insert --the-- before "sweep";

SIGNED AND
SEALED
JUN 5 1971

(SEAL)
Attest:

Edward M. Fletcher, Jr.
Attesting Officer

WILLIAM E. SCHUYLER, JR.
Commissioner of Patents